United States Patent [19]

Niebauer

[11] Patent Number: 4,993,893
[45] Date of Patent: Feb. 19, 1991

[54] CUTTING INSERT WITH CHIP CONTROL

[75] Inventor: Kenneth L. Niebauer, Raleigh, N.C.

[73] Assignee: Kennametal Inc., Latrobe, Pa.

[21] Appl. No.: 461,883

[22] Filed: Jan. 8, 1990

[51] Int. Cl.$^5$ .............................................. B23P 15/28
[52] U.S. Cl. .................................. 407/116; 407/114;
407/113
[58] Field of Search ........................ 407/116, 114, 113

[56] References Cited

U.S. PATENT DOCUMENTS

| 3,777,341 | 12/1973 | Faber | 407/114 |
| 4,629,372 | 12/1986 | Huston | 407/116 |
| 4,778,311 | 10/1988 | Niemi | 407/116 |
| 4,856,942 | 8/1989 | Bernadic et al. | 407/116 |
| 4,957,396 | 9/1990 | Niebauer | 407/114 |

Primary Examiner—Frederick R. Schmidt
Assistant Examiner—Lawarence Cruz
Attorney, Agent, or Firm—Thomas R. Trempus

[57] ABSTRACT

An improved cutting insert for threading applications has chip control features and includes an insert body having end wall regions, sides and top and bottom walls adapted for mounting in a pocket in a holder. The insert body has cutting edges and a notch in the top and bottom sides. The end wall regions each comprise two end walls converging toward one another as they extend from the insert's sides, forming at the juncture with the respective top and bottom walls, a cutting edge. The chip control geometry including a recess defining, when viewed in plan, a generally "V" shaped depression having the bottom of the "V" proximate the tip of the cutting edge. The extending arms of the "V" are distal the cutting edge tip and are crowned by a pair of backramps.

20 Claims, 3 Drawing Sheets

CUTTING INSERT WITH CHIP CONTROL

FIELD OF THE INVENTION

The invention is directed to cutting inserts, especially an improved metal cutting inserts with integral chip control features for use in threading applications.

BACKGROUND OF THE INVENTION

Cutting inserts are well known and a large percentage of them are of the throw away design. Such inserts are detachably clamped on a holder and then are discarded when they become dull or chipped. Throw away inserts are usually indexible and often reversible so that an insert can be provided with at least two cutting edges for selective presentation to the cutting position.

The provision of two or more cutting edges on the insert makes it economical to use and is particularly important with respect to throw away inserts because of the high cost of the materials from which the inserts are produced, especially when the material is, for example, a cemented metal carbide.

The inserts must be securely and accurately held in place within an insert holder during the cutting operation. This is especially true when the inserts are employed with numerically controlled machines which depend for accuracy upon an accurately located and firmly supported insert. When the inserts are of a substantial area, it is possible to fix the insert both accurately and firmly within the pocket of a toolholder by providing the insert with a central hole and the toolholder with a pin-type clamping device. In other cases, such inserts may be held in place by a top clamp. Examples of such holders are found in U.S. Pat. Nos. 3,754,309; 3,399,442, 3,762,005 and 4,834,592 and British Patent Specification No. 1,363,542.

The main object of metal machining is the shaping of the new work surface. Much attention is paid to the formation of the chip during the machining process, even though the chip is a waste product. This is because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the metal or alloy of the work piece.

It has been a common practice to place a mechanical chip breaking member between the insert and the clamp securing the insert to the tool in order to provide at least a degree of chip control during the cutting operation. This arrangement presents the obvious drawback of increasing the effective area necessary for metal cutting operations with a given tool.

Because chip control is an important consideration in metal cutting operations, it has been a long standing objective in the art of metal cutting to develop improved chip breaking members for use with tools as well as improved designs for the cutting inserts. One example of a cutting insert with chip breaking capabilities is the cut-grip inserts "GIP" available from ISCAR. The ISCAR insert has a land with a pair of generally parallel, elongated and elevated members which deform the metal chips as they are removed from the work piece. Another example of a cutting insert with features designed to provide chip control is the Econ-o-grove insert manufactured by Valenite Corporation. This insert has parallel side walls extending along a continuous descending wall, floor and back wall of constant radius. Another example of a cutting insert with a chipbreaker style is commercially available from Sandvik and is characterized by a non-continuous front face which may not provide a flat finish to the cut groove in a work piece.

On example of a metal cutting insert which is provided for threading applications and which is configured to facilitate chipbreaking is taught in U.S. Pat. No. 4,360,297, which is assigned to the assignee of the subject invention and which is incorporated herein by reference. U.S. Pat. No. 4,360,297 provides a recess formed along the horizontal surface adjacent the cutting edge. U.S. Pat. No. 4,834,592, which is assigned to the assignee of the present invention, teaches an improved metal cutting insert which is particularly well suited for use in grooving applications. This patented, grooving insert with integral chip control geometry is an improvement to the insert originally taught in U.S. Pat. No. 3,754,309. Likewise, the insert of this invention, a threading insert with integral chip control geometry represents a further improvement to the insert originally taught in U.S. Pat. No. 3,754,309.

It is an object of the invention to provide an insert with improved chip control geometry which results in improved chip breaking capabilities.

It is another object of this invention to provide such an insert with improved chip control characteristics for thread forming operations.

It is yet another object of this invention to provide an improved chip control insert configured to cooperate with a clamping element of an insert toolholder.

SUMMARY OF THE INVENTION

The invention provides both a cutting insert with a unique configuration in its chip breaker geometry that results in improved chip control. The insert with improved chip control features comprises an insert body having end wall regions and sides and top and bottom walls substantially perpendicular to the sides. The insert body is adapted for mounting in a pocket in an holder with one end region exposed. The insert body is invertible about an axis perpendicular to the sides thereof and the insert body has cutting edges at the end wall regions, whereby in each inverted position of the insert body a respective cutting edge is presented uppermost at the same end of the insert body.

The top and bottom walls or seating surfaces of the insert body define therein means for cooperating with the clamping arrangement of an insert tool holder. While several configurations are known in the art, one such preferred clamping arrangement which has been found to be extremely effective is a diagonal notch, which extends thereacross at an angle such that each notch when uppermost forms substantially the same angle with the sides of the insert. The diagonal notch system is disclosed in detail in U.S. Pat. Nos. 3,754,309 and 4,834,592, the contents of which are incorporated herein by reference.

Each of the end wall regions of the insert defines at least in part a cutting edge for presentation to a work piece. The end wall regions comprise at least two end walls that converge toward one another as they extend from the center portion of the insert, and a recess means is formed on at least one of said top and bottom walls. The recess means has an outer region that extends along the outer edge of said top or bottom wall and the cutting edges are formed at the juncture of said outer regions with the convergent end walls. The recess includes a land region proximate the cutting edge, a descending wall, a floor region, an ascending wall and a pair of backramps which form an interrupted parallel wall. The recess defines a generally "V" shaped depression having the bottom of the "V" proximate the juncture of said outer regions with the convergent end walls and the extending arms of the "V" being distal the juncture and crowned by the pair of backramps.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
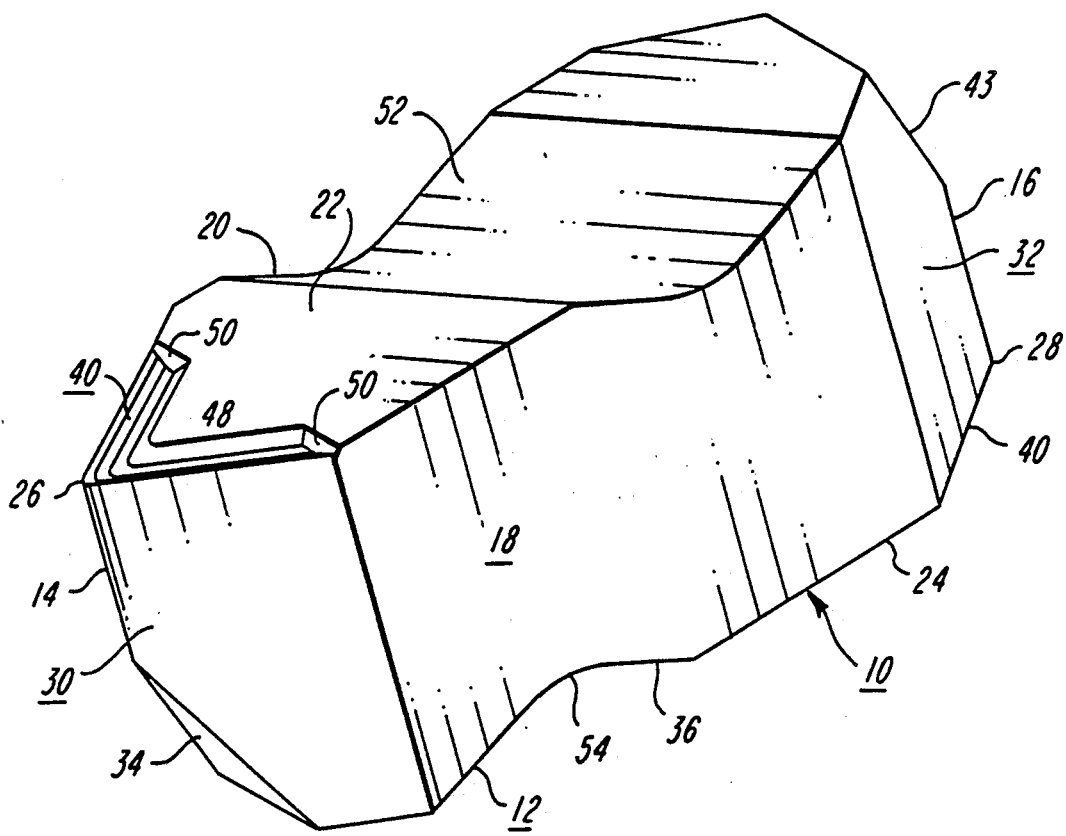
FIG. 1 is an isometric view of a cutting insert configured for chip control, all according to the present invention.
Figure 5:
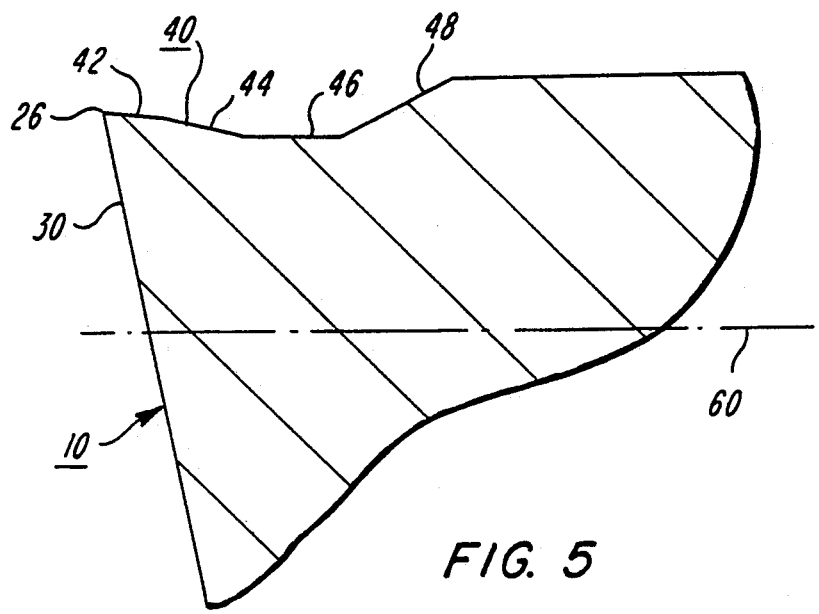
FIG. 5 is a section along lines V—V of FIG. 4.

An improved cutting insert with chip control features is isometrically shown in FIG. 1 and generally indicated by the reference character 10. The insert 10 comprises an insert body 12 having a first flank or end wall 14, a second opposed flank or end wall 16, first and second sides 18 and 20 and top and bottom seating surfaces or walls 22 and 24. The insert body 12 is preferably made from a hard cemented carbide such as tungsten or titanium carbide or tungsten titanium carbide or TiC-TiN.

Each of the end wall regions 14 and 16 of the insert 10 defines at least in part a cutting edge 26 and 28 for presentation to a work piece. The end wall regions 14 and 16 each comprise at least two end walls 30 and 32 that converge toward one another, as at 34, as they extend from the center portion 36 of the insert 10. A recess means 40 is formed on at least one of said top and bottom walls, 22 and 24. At the juncture of one end part 14 and top wall 22 there is one cutting edge 26. At the juncture of the other end wall region 16 and the bottom wall 24 there is a second cutting edge 28. The cutting edge 26 is of a lesser elevation than the top wall 22. Preferably, a recess 40 is provided proximate each said cutting edge 26 and 28.

In order to enhance the clarity of the description of the chipbreaker geometry of this invention, the discussion of the recess 40 will be directed to the single representation thereof in the several drawings. It is of course to be understood that the indexibility of the insert contemplates that both the insert's cutting edge configuration and geometry as well as the chipbreaker geometry are symmetrical.

The recess means 40 has an outer region or land 42 that extends along the outer edge of said top wall 22 and the cutting edge 26 is formed at the juncture of said outer region 42 with the convergent end walls 30 and 32. In addition to the land region 42 proximate the cutting edge, the recess 40 includes a descending wall 44, a floor region 46, an ascending wall 48 and a pair or backramps 50 which form an interrupted parallel wall. The recess 40 defines when viewed in plan, a generally "V" shaped depression having the bottom of the "V" proximate the cutting edge or juncture 26 of said outer regions with the convergent end walls wherein the extending arms of the "V" are distal the juncture and crowned by the pair of backramps 50.

The insert body 12 of the insert 10 is formed with a diagonal groove 52 in the top all 22 and a diagonal groove 54 in the bottom wall 24 of the insert. Each groove 52 and 54 is preferably "V" shaped in cross section and adapted for engagement by the toolholder assembly which will be described below. With the insert configuration as described above, in each inverted position of the insert body 12, a respective cutting edge is presented uppermost at the same end of the insert body. The diagonal notch or grooves 52 and 54 extending across the insert body are disposed at an angle such that each notch, when uppermost, forms substantially the same angle with the sides 18 and 20 of the insert body 12. Also, in each inverted position, the insert body 12 presents an end wall region of the insert defining at lest in part the cutting edge 26 or 28 to a work piece.

As can be more clearly appreciated through consideration of FIGS. 3, 4, 5 and 6, in conjunction with FIG. 1, the insert body 12 includes at each end region thereof the recess means 40 which is configured according to the unique chipbreaker geometry of this invention. While the illustrations of the several sections which comprise the recess 40 are shown to have very distinctive boundaries, it is to be appreciated that each of these sections must, as a result of manufacturing requirements blend into its adjoining section or sections. This blending intersection is of a radius defined by the minimum manufacturing requirements the process used to fabricate the insert. Typically, such a blend intersection of approximately 0.010 inch. The recess means 40 has an outer region or land 42 that extends along the outer edge of said top wall 22 and the cutting edge 26 is formed at the juncture of said outer region 42 with the convergent end walls 30 and 32. The land 42 is disposed at an angle of approximately 10 degrees, plus or minus 5 degrees, relative to an imaginary plan defined as traversing the cutting edge and body of the insert and being generally parallel to the top and bottom faces 22 and 24 of the insert body 12. This imaginary plain is represented at the reference character 60.

The forward edge of the land 42 extends along the outer edge of said top wall 22 and the cutting edge 26 is formed at the juncture of said outer region 42 with the convergent end walls 30 and 32. The reward edge of the land 42 intersects the descending wall 44 which in turn intersects the floor region 46. The descending wall 44 is disposed at an angle of approximately 25 degrees, plus or minus approximately 10 degrees. The floor region 46 with which the descending wall intersects is generally parallel with the imaginary plain 60.

The ascending wall 48 intersects the floor region 46 and terminates in the top face 22 of the insert body 12. The ascending wall 48 is disposed at an angle of approximately 45 degrees, plus or minus approximately 15 degrees, relative to the imaginary plain 60. The combination of the land region 42, the descending wall 44, the floor region 46 and the an ascending wall 48 defines when viewed in plan, a generally "V" shaped depression having the bottom or point of the "V" proximate the cutting edge or juncture 26 of said outer regions with the convergent end walls. The extending arms of the "V" are distal the juncture and crowned by the pair of separate backramps 50. The pair of backramps 50 form an interrupted parallel wall. The parallel wall is generally perpendicular to the transverse axis of the insert body about which the insert is indexible. The pair of backramps 50 which form an interrupted parallel wall are disposed at an angle of approximately 45 degrees, plus or minus approximately 5 degrees, relative to the imaginary plain 60.

It has been found when cutting metal with the insert of the present invention that a chip coming off a work piece in a light feed comes off the land area of the insert and strikes the backramp 48 wherein breakage is caused by the force of the chip's impact with either the back ramp or the chip itself as the chip is directed back toward the work piece. In a heavier feed rate, breakage appears to be the result of a combination of the chip striking the floor 46 and the back ramp 48 as well as the chip turning back in on itself. The chip coming from the work piece forms a generally "U" shaped cross section as a result of the chip control feature of the insert.

While as shown in the several Figures, the land region 42 descends toward the descending wall 44 at a slight angle, it is believed that the lack of such a descending angle would not adversely impact chip control. However, this descending angle is believed to contribute to a reduction in cutting forces and thus is a preferable feature.

Figure 2:
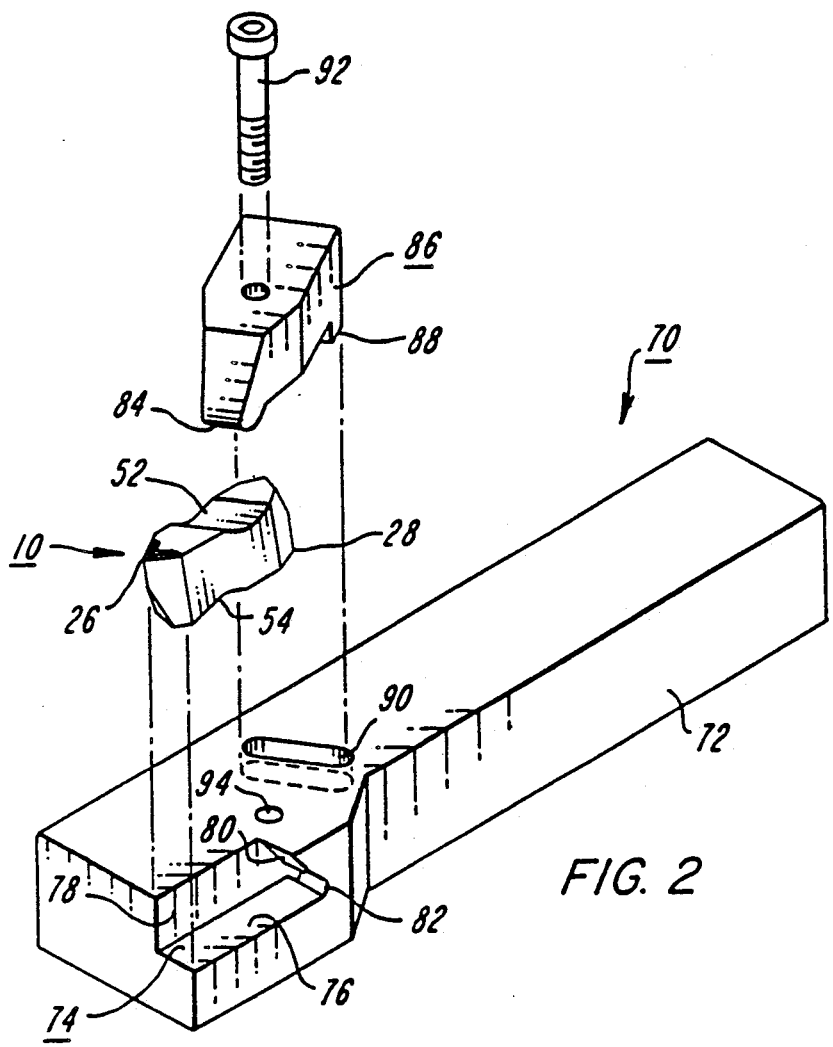
FIG. 2 is an exploded perspective view illustrating a typical holder and clamping arrangement for use in combination with the cutting insert this invention.
Figure 6:
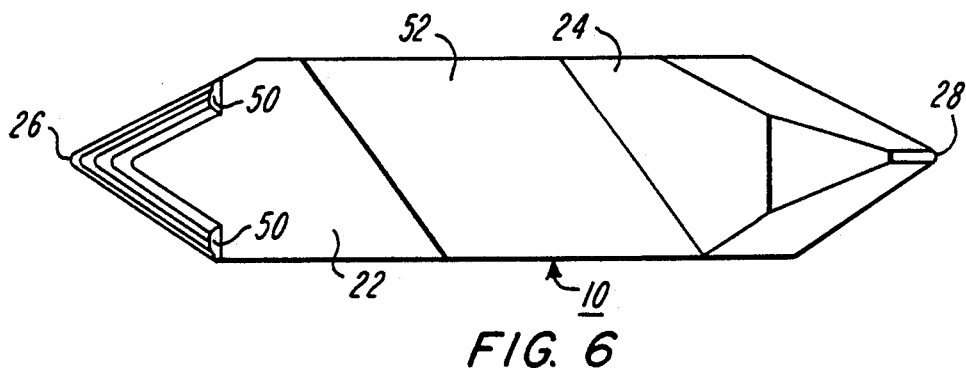
FIG. 6 is a plan view of the insert of this invention.
Figure 3:
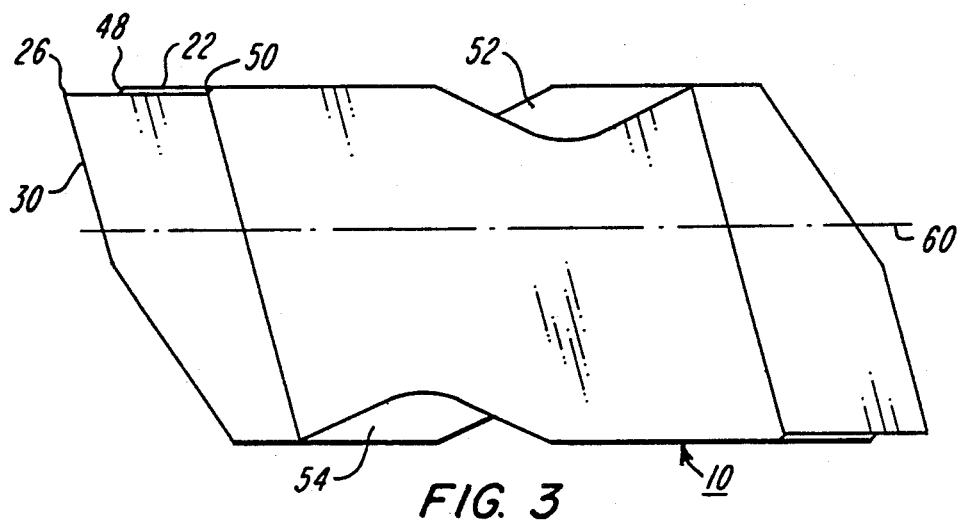
FIG. 3 is a side view of the insert of this invention.
Figure 4:
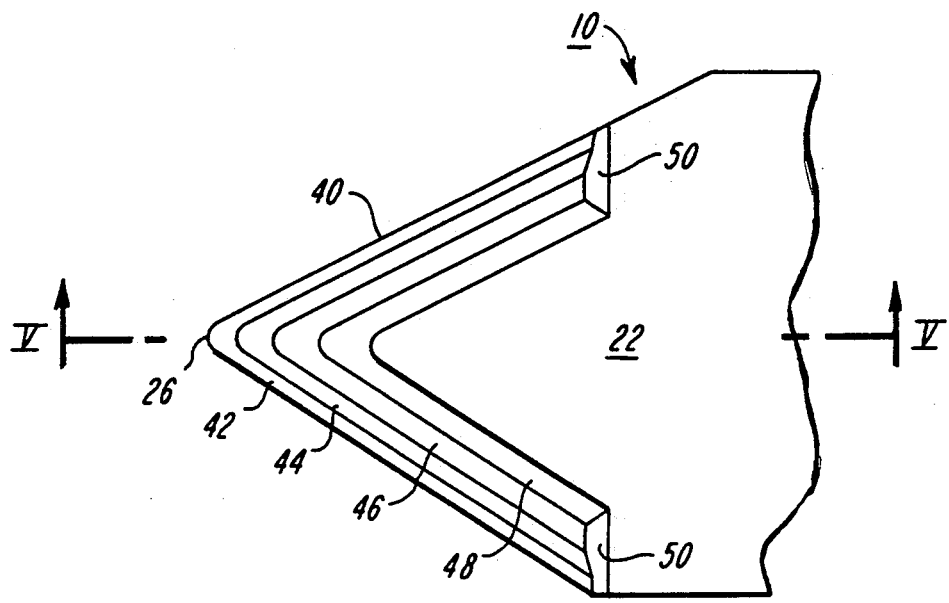
FIG. 4 is a an enlarged fragment plan view illustration the end region of the insert of FIG. 1.

Turning now to FIG. 2, there is shown a toolholder 70 which is ideally suited for use in combination with the insert 10 of this invention. The toolholder 70 is in the form of a bar-like steel member 72 adapted for being clamped in a tool support of any suitable type. At one end of the member 72 there is an insert pocket 74 having a bottom wall 76, a side wall 78 and a back wall 80. Advantageously, an undercut is provided at the juncture of the bottom and back walls as indicated at 82 in order to protect the cutting edge 26, 28 of the insert 10 which is disposed in that region in each clamped position of the insert 10.

It will be noted that bottom and side walls 76 and 78 of the pocket are at right angles to each other whereas back wall 80 may be at a right angle to side wall 78 but converges with bottom wall 80 in the direction toward the back of the pocket. This pocket 74 is adapted for receiving an insert 10 therein. As described above, the insert 10 is provided with "V" shaped notches or grooves 50 and 52. These grooves 50 and 52 are adapted for engagement by the rounded nose 84 on the one end of one leg of a clamp member 86 which is in the form of an inverted "U" shaped member.

Clamping member 86 has a further leg 88 adapted for being received in a recess 90 formed in the top of the holder 70. A clamp screw 92 extends through a hole in the clamp member 86 between the legs thereof and into a threaded hole 94 provided in the top wall of the holder.

When the insert is placed in the pocket, the clamp member is put in position, and screw 92 is tightened up, and the insert is pressed firmly against the bottom wall 76 of the pocket while simultaneously being drawn toward walls 78 and 80. The insert is thus fixedly clamped in the pocket in the holder and is accurately located therein by being forced against the side walls of the pocket.

The side wall 78 of the pocket is preferably at a slight angle, approximately about 3 degrees, to the longitudinal axis of the holder 70. For this reason, the opposite ends of the insert are shaped in such a manner as to compensate for the small angularity of the wall 78 to the longitudinal axis of the holder 70.

A more detailed description of this as well as several other clamping arrangements and toolholders which can be advantageously utilized with the subject cutting insert can be had through a review of U.S. Pat. No. 3,754,309, entitled "Cutting Insert and Clamping Arrangement Therefor," which patent is assigned to the assignee of the present invention and incorporated by reference herein.

It has been found that a metal cutting insert incorporating the chip control features described herein provides significantly improved chip control over a wide variety of metalcutting conditions. Additionally, the new insert configuration facilitates the manufacturing process. What has been described in an improved cutting insert with chip control features and a method for the manufacture of such cutting inserts.

What is claimed is:

1. An improved cutting insert with chip control features comprising an insert body having sides and top and bottom walls defining therein means forming a notch and being generally perpendicular to said sides, said insert body being invertible about an axis perpendicular to said sides thereof and having end wall regions which each comprise two end walls converging toward one another as they extend from the insert's sides forming at the juncture with the respective top and bottom walls, a cutting edge, said top and bottom walls further defining therein a recess proximate each said cutting edge, each said recess having a land extending along the respective cutting edge and terminating in a descending wall which in turn terminates in a floor region which in turn terminates in an ascending wall terminating in said respective top or bottom portions of the insert body, and a pair of backramps which form a pair of walls parallel with said axis, said recess defining, when viewed in plan, a generally "V" shaped depression having the bottom of the "V" proximate the cutting edge at the juncture of said two convergent end walls and wherein the extending arms of the "V" extend from the juncture and terminate in the pair of backramps whereby in each inverted position of said insert body a respective cutting edge is presented uppermost at the same end of said insert body.

2. The improved cutting insert according to claim 1 wherein the backramps ascend from the edge of the floor region toward the respective top or bottom wall at an angle of approximately between about 40 to 50 degrees relative to said respective top or bottom wall.

3. The improved cutting insert according to claim 2 wherein the backramps ascend from the rearward edge of the floor region toward the respective top or bottom wall at an angle of approximately 45 degrees relative to said respective top or bottom wall.

4. The improved cutting insert according to claim 1 wherein the descending wall portion proximate the forward edge of the floor region descends thereto at an angle of approximately between about 15 to 35 degrees with respect to the planar floor.

5. The improved cutting insert according to claim 4 wherein the descending wall portion proximate the forward edge of the floor region descends thereto at an angle of approximately 25 degrees with respect to the planar floor.

6. The improved cutting insert according to claim 1 wherein the land proximate the cutting edge slopes downwardly toward the descending wall at an angle of approximately between about 5 to 15 degrees with respect to the top wall of said insert body.

7. The improved cutting insert according to claim 6 wherein the land proximate the cutting edge slopes downwardly toward the descending wall at an angle of approximately 10 degrees with respect to the top wall of said insert body.

8. The improved cutting insert according to claim 1 wherein each said means forming a notch defines a diagonal notch extending across the insert at an angle such that each notch when uppermost forms substantially the same angle with said sides of the insert.

9. The improved cutting insert according to claim 8 wherein each said diagonal notch is substantially "V" shaped in cross section.

10. The improved cutting insert according to claim 1 wherein the cutting edge is of a lesser elevation than the respective top or bottom wall.

11. In combination with a cutting tool holder adapted to receive therein and to retain a cutting insert by means of insert retaining means, cutting insert with chip control features comprising an insert body having sides and top and bottom walls defining therein means forming a notch and being generally perpendicular to said sides, said means forming a notch cooperating with said insert retaining means for the positive retention of said insert in said cutting tool holder and wherein said insert body is invertible about an axis perpendicular to said sides thereof; said insert body having end wall regions which each comprises two end walls converging toward one another as they extend from the insert's sides forming at the juncture with the respective top and bottom walls, a cutting edge, said top and bottom walls further defining therein a recess proximate each said cutting edge, each said recess having a land extending along the respective cutting edge and terminating in a descending wall which in turn terminates in a floor region which in turn terminates in an ascending wall terminating in said respective top or bottom portions of the insert body, and a pair of backramps which form a pair of walls parallel with said axis, said recess defining, when viewed in plan, a generally "V" shaped depression having the bottom of the "V" proximate the cutting edge at the juncture of said two convergent end walls and wherein the extending arms of the "V" extend from the juncture and terminate in the pair of backramps whereby in each inverted position of said insert body a respective cutting edge is presented uppermost at the same end of said insert body.

12. The improved cutting insert according to claim 1 wherein the backramps ascend from the edge of the floor region toward the respective top or bottom wall at an angle of approximately between about 40 to 50 degrees relative to said respective top or bottom wall.

13. The improved cutting insert according to claim 12 wherein the backramps ascend from the rearward edge of the floor region toward the respective top or bottom wall at an angle of approximately 45 degrees relative to said respective top or bottom wall.

14. The improved cutting insert according to claim 11 wherein the descending wall portion proximate the forward edge of the floor region descends thereto at an angle of approximately between about 15 to 35 degrees with respect to the planar floor.

15. The improved cutting insert according to claim 14 wherein the descending wall portion proximate the forward edge of the floor region descends thereto at an angle of approximately 25 degrees with respect to the planar floor.

16. The improved cutting insert according to claim 11 wherein the land proximate the cutting edge slopes downwardly toward the descending wall at an angle of approximately between about 5 to 15 degrees with respect to the top wall of said insert body.

17. The improved cutting insert according to claim 16 wherein the land proximate the cutting edge slopes downwardly toward the descending wall at an angle of approximately 10 degrees with respect to the top wall of said insert body.

18. The improved cutting insert according to claim 11 wherein each said means forming a notch defines a diagonal notch extending across the insert at an angle such that each notch when uppermost forms substantially the same angle with said sides of the insert.

19. The improved cutting insert according to claim 18 wherein each said means forming a notch is substantially "V" shaped in cross section.

20. The improved cutting insert according to claim 1 wherein the cutting edge is of a lesser elevation than the respective top or bottom wall.

* * * * *

UNITED STATES PATENT AND TRADEMARK OFFICE
CERTIFICATE OF CORRECTION

PATENT NO. : 4,993,893
DATED : February 19, 1991
INVENTOR(S) : Kenneth L. Niebauer It is certified that error appears in the above—identified patent and that said Letters Patent is hereby corrected as shown below:

Column 3, line 27, after is, delete "a".
Column 4, line 3, delete "or" and substitute ---of---.
Column 4, line 12, delete "all" and substitute ---wall---.
Column 4, line 26, delete "lest" and substitute ---least---.
Column 4, line 46, delete "plan" and substitute ---plane---.
Column 4, line 49, delete "plain" and substitute ---plane---.
Column 4, line 54, delete "reward" and substitute ---rearward---.
Column 4, line 60, delete "plain" and substitute ---plane---.
Column 4, line 65, delete "plain" and substitute ---plane---.
Column 4, line 67, delete "an".
Column 5, line 12, delete "plain" and substitute ---plane---.
Column 6, line 20, delete "in" and substitute ---is---.

Signed and Sealed this

Twenty-ninth Day of September, 1992

Attest:

DOUGLAS B. COMER

Attesting Officer

Acting Commissioner of Patents and Trademarks